US011263519B2

(12) United States Patent
Thiele et al.

(10) Patent No.: US 11,263,519 B2
(45) Date of Patent: Mar. 1, 2022

(54) STDP-BASED LEARNING METHOD FOR A NETWORK HAVING DUAL ACCUMULATOR NEURONS

(71) Applicant: COMMISSARIAT A L'ENERGIE ATOMIQUE ET AUX ENERGIES ALTERNATIVES, Paris (FR)

(72) Inventors: Johannes Christian Thiele, Orsay (FR); Olivier Bichler, Vieille Eglise en Yvelines (FR)

(73) Assignee: COMMISSARIAT A L'ENERGIE ATOMIQUE ET AUX ENERGIES ALTERNATIVES, Paris (FR)

( * ) Notice: Subject to any disclaimer, the term of this patent is extended or adjusted under 35 U.S.C. 154(b) by 647 days.

(21) Appl. No.: 16/196,515

(22) Filed: Nov. 20, 2018

(65) Prior Publication Data

US 2019/0156179 A1  May 23, 2019

(30) Foreign Application Priority Data

Nov. 22, 2017 (EP) .................................... 17203159

(51) Int. Cl.
*G06N 3/04* (2006.01)
*G06N 3/06* (2006.01)
(Continued)

(52) U.S. Cl.
CPC ........... *G06N 3/049* (2013.01); *G06N 3/0454* (2013.01); *G06N 3/063* (2013.01); *G06N 3/0635* (2013.01); *G06N 3/088* (2013.01)

(58) Field of Classification Search
CPC ....... G06N 3/049; G06N 3/0635; G06N 3/088
See application file for complete search history.

(56) References Cited

U.S. PATENT DOCUMENTS

| 8,930,291 B1 | 1/2015 | Srinivasa et al. |
| 2018/0075344 A1* | 3/2018 | Ma .................. G06N 3/0481 |
| 2018/0300617 A1* | 10/2018 | McBride ............ G06F 3/0604 |

OTHER PUBLICATIONS

European Search Report dated May 28, 2018 in European Application 17203159.3, filed on Nov. 22, 2017.
(Continued)

*Primary Examiner* — Hal Schnee
(74) *Attorney, Agent, or Firm* — Oblon, McClelland, Maier & Neustadt, L.L.P.

(57) ABSTRACT

A method for unsupervised learning of a multilevel hierarchical network of artificial neurons wherein each neuron is interconnected with artificial synapses to neurons of a lower hierarchical level and to neurons of an upper hierarchical level. The method includes at a neuron the steps of integrating inference spikes from the interconnected neurons of the lower hierarchical level both in a first and a second accumulators using the same synaptic weights; when the first accumulator reaches a first threshold, generating a learning spike, resetting the first accumulator, triggering synaptic conductance modification in accordance with a spike-timing dependent plasticity rule and delivering the learning spike as an inhibitory signal to other neurons in the same hierarchical level; when the second accumulator reaches a second threshold, generating an inference spike, delivering the generated inference spike to the interconnected neurons of the upper hierarchical level, resetting the second accumulator and possibly delivering the inference spike as an inhibitory signal to other neurons in the same hierarchical level.

10 Claims, 2 Drawing Sheets

(51) Int. Cl.
*G06N 3/08* (2006.01)
*G06N 3/063* (2006.01)

(56) References Cited

OTHER PUBLICATIONS

Kheradpisheh, S., et al. "STDP-based spiking deep neural networks for object recognition", arXiv 1611.01421lv1, 2016, 16 pages.
Kheradpisheh, S., et al. "STDP-based spiking deep neural networks for object recognition", arXiv 1611.01421lv2, 2017, 20 pages.

* cited by examiner

STDP-BASED LEARNING METHOD FOR A NETWORK HAVING DUAL ACCUMULATOR NEURONS

TECHNICAL DOMAIN

The invention relates to neuromorphic systems, i.e. systems which use silicon-based implementations of biological neurons as a hardware for information processing and artificial intelligence. More specifically, the invention relates to a spiking neural network which performs unsupervised learning using spike-timing dependent plasticity (STDP).

BACKGROUND

Biological systems receive information that typically comes in the form of events that occur on a wide variety of spatial and temporal scales. Yet a biological system such as the brain is able to integrate those events and extract relevant pieces of information.

In biological systems, the point of contact between an axon of a neuron and a dendrite on another neuron is called a synapse, and with respect to the synapse, the two neurons are respectively called pre-synaptic and post-synaptic. Neurons, when activated by sufficient inputs received via synapses, emit "spikes" that are delivered to those synapses that the neuron is pre-synaptic to. Synaptic conductance is a measure of the amount of influence a synapse will have on its post-synaptic target when the synapse is activated by a pre-synaptic spike. As per STDP, the synaptic conductance can change with time as a function of the relative spike times of pre-synaptic and post-synaptic neurons. Under a typical (postsynaptic) STDP rule, the conductance of a synapse is increased if its post-synaptic neuron fires after its pre-synaptic neuron fires, and decreased if the order of the two firings is reversed.

Neuromorphic systems are computational systems that function in a manner analogous to that of biological brains by creating connections between processing elements that are roughly functionally equivalent to neurons of a biological brain. For instance, a spiking neural network which performs STDP-based unsupervised learning can be used for object recognition, as for instance discussed in the article by Kheradpisheh et al., "STDP-based spiking deep neural networks for object recognition", arXiv 1611.01421.

Such a network typically comprises a temporal-coding layer (in the case of non-temporal stimuli, such as images) followed by a cascade of consecutive convolutional (feature extractor) and pooling layers. If the stimulus is non-temporal, the first layer converts the input image into an asynchronous spike train where the visual information is encoded in the temporal order of the spikes. Alternatively, it is possible to directly feed an event-based stimulus from an event-based sensor into the network (e.g. a Dynamic Vision Sensor). Neurons in convolutional layers detect more complex features by integrating input spikes from the previous layer which detects simpler visual features. Neurons in convolutional layers emit a spike as soon as they detect their preferred visual feature. Through the learning phase, neurons that fire earlier trigger STDP learning and prevent others neurons from firing via a winner-take-all mechanism. Pooling layers aggregate information from neuron clusters and provide a degree of translational invariance to the network.

A convolutional layer contains several neuronal maps. Neurons in a specific map detect the same visual feature but at different locations. To this end, synaptic weights of neurons belonging to the same map are the same (i.e., weight sharing). Each neuron receives input spikes from the neurons located in a determined window (the receptive field of the neuron) in all neuronal maps of the previous layer. Hence, a visual feature in a convolutional layer is a combination of several simpler feature extracted in the previous layer.

Neurons in all convolutional layers are typically integrate-and-fire (IF) or leaky integrate-and-fire (LIF) neurons which gather input spikes from presynaptic neurons and emit a spike when their internal potentials reach a pre-specified threshold. Each presynaptic spike increases the neuron's potential by its synaptic weight (i.e. the synapse conductance). Each time a spike arrives through the $j^{th}$ synapse of the $i^{th}$ neuron, the internal potential of the $i^{th}$ neuron is updated as follows: $V_i(t)=V_i(t-1)+w_{ji}$, where $V_i(t)$ is the internal potential of the $i^{th}$ neuron at time t of presynaptic spike arrival and $w_{ji}$ is the synaptic weight between the $j^{th}$ presynaptic neuron and the $i^{th}$ convolutional neuron. If $V_i$ exceeds its threshold $V_{thr}$, then the convolutional neuron emits a spike and $V_i$ is reset: $V_i(t)=0$ if $V_i(t)>V_{thr}$.

During the learning of a convolutional layer, neurons in the same map typically compete with each other to emit a spike and perform STDP. The first neuron which reaches the threshold and spikes is the winner. The winner triggers STDP and updates its synaptic weights. As mentioned before, neurons in different locations of the same map have the same input synaptic weights (i.e., weight sharing) to be selective to the same feature. Hence, the winner neuron prevents other neurons in its own map to do STDP (global intra-map competition) and duplicates its updated synaptic weights into them. Depending on the implementation, the weights are directly shared by the neurons in one map and therefore do not have to be explicitly duplicated. The intra-map competition can for instance be performed by an inhibitory signal which prevents other neurons in the same map from firing and performing STDP. A local inter-map competition for STDP can also be implemented: when a neuron is allowed to do the STDP, it prevents the neurons in other maps within a small neighborhood around its location from doing STDP. This inter-map competition encourages neurons of different maps to learn different features.

In the network built by Kheradpisheh, learning is done layer by layer, i.e. the learning in a convolutional layer starts when the learning in the previous convolutional layer is finalized. This takes away the possibility to perform approximate inference already during the learning process (as this would require the output of the highest layer). It also takes away any possibility to use the output of higher layers to influence the features learned in the layers below, making it for instance difficult to combine the network with tools such as reinforcement learning or other mechanism which involves feedback from higher layers to lower ones and therefore enables complex multi-layer representations.

Further, although the inter-map competition which is implemented during training of a layer is necessary to diversify the learned features in each layer, it significantly reduces the number of spikes which are emitted by neurons and prevents simultaneous emission of spikes from different neurons which receive the same input. This limits the amount of information which is received by the higher layers and also prevents the propagation of spike codes which are a combination of several features represented by these neurons. Additionally, if an inhibitory signal is used for the intra-map competition, this prevents neurons in the same map to fire simultaneously for different positions of the input, which prevents the parallel propagation of spikes for the full input volume.

BRIEF SUMMARY

The invention aims at overcoming these drawbacks, and proposes a method for unsupervised learning of a multilevel hierarchical network of artificial neurons wherein each neuron is interconnected by means of artificial synapses to neurons of a lower hierarchical level and to neurons of an upper hierarchical level. The method comprises at a neuron the following steps.

Inference spikes from the interconnected neurons of the lower hierarchical level are integrated both in a first and a second accumulators.

In response to the integrated inference spikes in the first accumulator reaching a first threshold, first accumulator is reset, a learning spike is generated, and synaptic conductance modification is triggered of the synapses that interconnect the neuron with the interconnected neurons of the lower hierarchical level in accordance with a spike-timing dependent plasticity rule.

In response to the integrated inference spikes in the second accumulator reaching a second threshold, the second accumulator is reset, an inference spike is generated and delivered to the interconnected neurons of the upper hierarchical level.

The method may further comprise, at said neuron, the steps of:
  in response to the integrated inference spikes in the first accumulator reaching the first threshold, generating a learning inhibition signal and delivering the generated inhibition signal to neurons in the same hierarchical level,
  in response to receiving a learning inhibition signal, resetting the first accumulator and inhibiting generation of a learning spike.

Said neuron may belong to a neuronal map composed of a plurality of neurons and delivering by said neuron the generated learning inhibition signal may comprise delivering the generated learning inhibition signal to the other neurons in the neuronal map. Said delivering the generated learning inhibition signal may further comprise delivering the generated learning inhibition signal to neurons present in one or more other neuronal maps in a vicinity of a position corresponding to the location of said neuron in its neuronal map.

The method may further comprise, at said neuron, the steps of:
  in response to the integrated inference spikes in the second accumulator reaching the second threshold, generating an inference inhibition signal and delivering the generated inhibition signal to neurons in the same hierarchical level,
  in response to receiving an inference inhibition signal, resetting the second accumulator and inhibiting generation of an inference spike.

The spike-timing dependent plasticity rule consists in increasing the conductance of a synapse that interconnects said neuron with an interconnected neuron of the lower hierarchical level if the interconnected neuron generated a learning spike since the last time the first accumulator of said neuron was reset, and in decreasing said conductance otherwise.

The spike-timing dependent plasticity rule may consist in increasing the conductance w of a synapse by a quantity $\alpha_+$ $\exp(-\beta_+ w)$ or in decreasing said conductance by a quantity $\alpha_-$ $\exp(-\beta_- w)$, where $\alpha_+ > 0$, $\alpha_- < 0$ and $\beta_+ \geq 0$, $\beta_- \geq 0$.

The first and the second threshold may be different.

The invention extends to a multilevel hierarchical network of artificial neurons configured to perform this unsupervised learning method. It also extends to a method for extracting and classifying patterns from a data stream, comprising inputting an asynchronous spike train in the multilevel hierarchical network after it has performed or when it is performing the unsupervised learning method.

BRIEF DESCRIPTION OF THE DRAWINGS

Other aspects, goals, advantages and features of the invention will appear more clearly on reading the following detailed description of preferred embodiments thereof, given by way of non-limiting examples and with reference to the accompanying drawing in which.

DETAILED DESCRIPTION

The invention relates to a method for unsupervised learning of a multilevel hierarchical network of artificial neurons, said learning using STDP (spike-timing dependent plasticity).

The multilevel hierarchical network of neurons comprises a cascade of consecutive convolutional (feature extractor) and possible pooling layers. It can be preceded by a temporal-coding layer which is configured to convert an input data stream into an asynchronous spike train where the information (for instance visual information in images) is encoded in the temporal order of the spikes. Alternatively, input from an event-based vision sensor can be directly fed into the network.

In this network, each neuron in a convolutional layer is interconnected by means of artificial synapses to neurons of a lower hierarchical level and to neurons of an upper hierarchical level (if applicable, i.e. the neuron is not in the highest level). Each synapse is connected on one-side to a pre-synaptic neuron (input neuron) and on the other side to a post-synaptic neuron (output neuron), with the input neuron belonging to a hierarchical level which is lower than the hierarchical level to which the output neuron belongs. The synapse has a conductance (synaptic weight) that can be modified during a learning phase of the network in accordance with a STDP rule.

Figure 1:
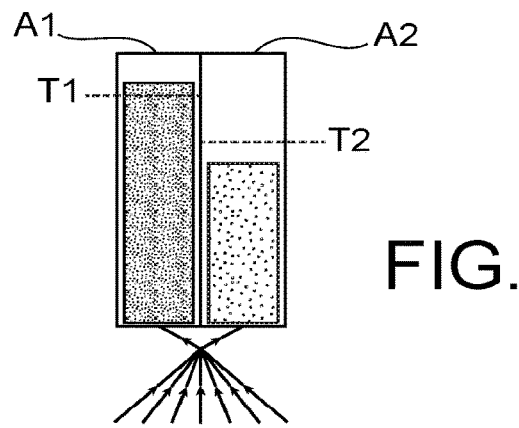
FIG. 1 is a diagram of a multi-threshold neuron having two concurrent spikes accumulators.
Figure 5:
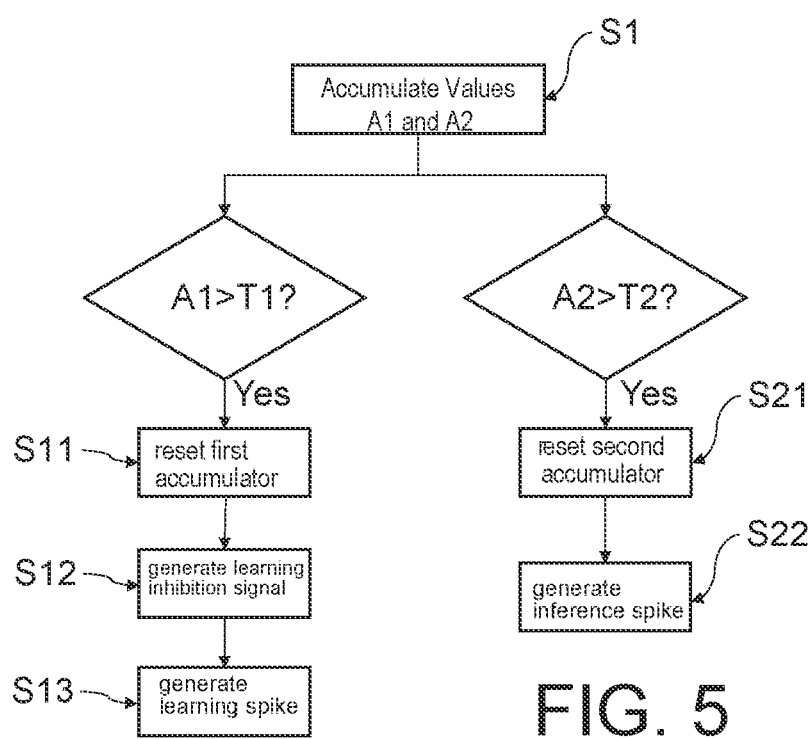
FIG. 5 is a flowchart showing steps of the learning method according to the invention.

In accordance with the invention, and with reference to FIGS. 1 and 5, each neuron is a (possibly leaky) integrate-and-fire neuron which possesses two separate accumulators A1, A2 which independently integrate (at step S1) the same (synaptic) information received from the interconnected lower level neurons. More specifically, both accumulators A1, A2 integrate inference spikes from the interconnected neurons of the lower hierarchical level using the same synaptic weights. In each accumulator, a presynaptic inference spike increments the accumulator by the corresponding synaptic weight (i.e. the conductance of the synapse that connects the lower level neuron with the higher level neuron).

Both accumulators can have different firing threshold values (the below mentioned first and second thresholds), different leakage currents (if any) or be different in any other neural parameters which act on the integration variable.

As will be detailed below, having such a dual-accumulator structure allows separating the (competitive) learning dynamics from the inference dynamics.

A first accumulator (learning accumulator) A1 is used for triggering synaptic conductance modification of the synapses that interconnect the neuron with the neurons of the lower hierarchical level. The synaptic conductance modification is made in accordance with a STDP rule that makes use of learning spikes generated when a first accumulator A1 reaches a first threshold T1. As detailed below, this first accumulator can also be used to implement a competitive mechanism between neurons whereby lateral inhibition is performed once a winning neuron has fired a learning spike.

A second accumulator (inference accumulator) A2 is used for generating inference spikes when the second accumulator reaches a second threshold T2. The inference spikes are the only spikes that are propagated to neurons in the upper hierarchical level (when there is such an upper level). The inference spikes do not trigger STDP updates. This inference accumulator A2 can also be associated with a competitive mechanism, with a possibly different connectivity structure (which neurons are inhibited) and competition process (for instance soft winner take-all) than the competitive mechanism used in the learning process.

Figure 2:
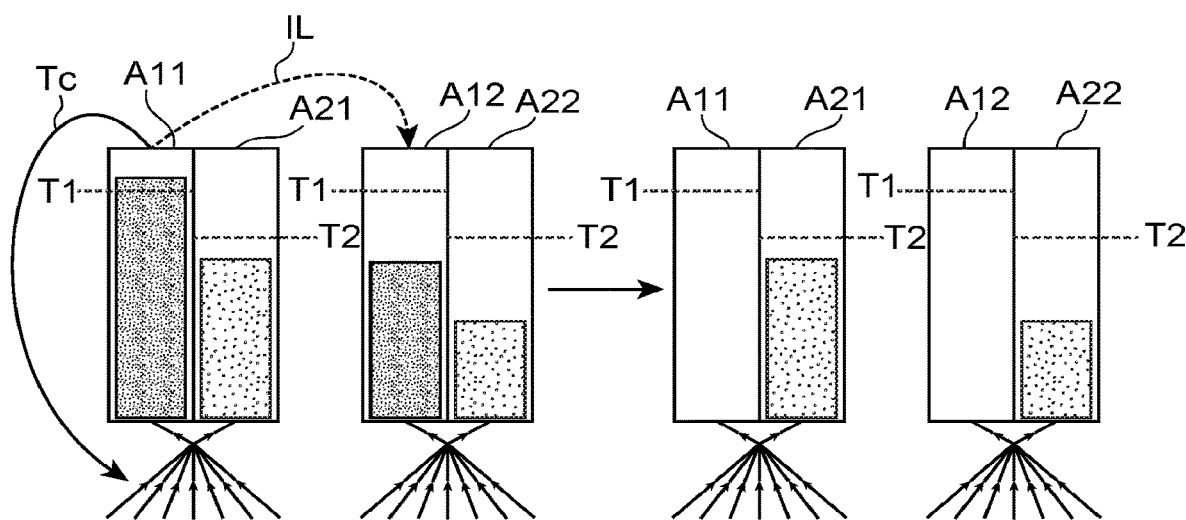
FIG. 2 is a diagram showing the accumulators of two neurons coupled via lateral inhibition when the first accumulator (STDP triggering or learning accumulator) of one of the neurons reaches its threshold.
Figure 3:
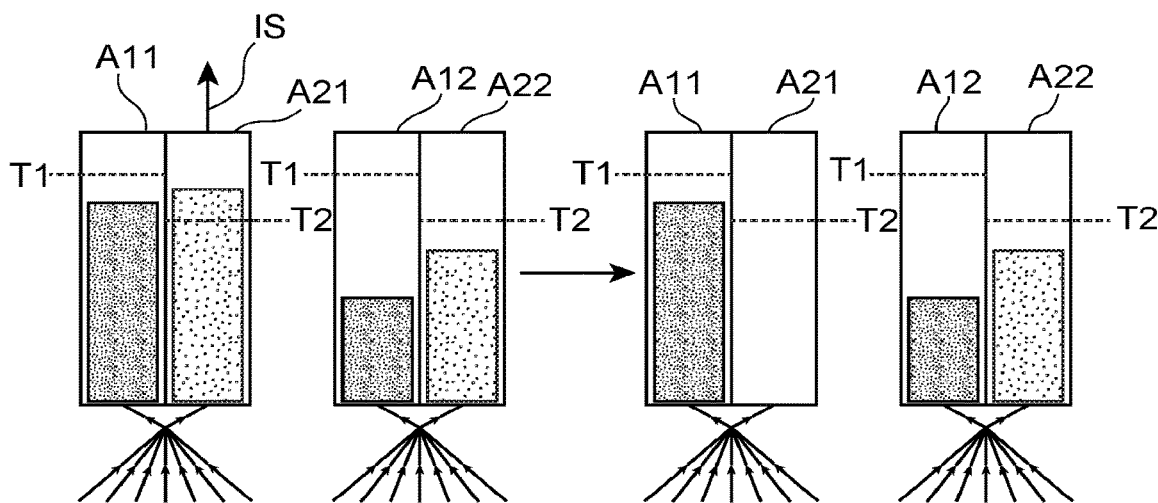
FIG. 3 is a diagram showing the accumulators of two neurons when the second accumulator (inference accumulator) of one of the neurons reaches its threshold.

FIGS. 2 and 3 shows two neurons in the same hierarchical level with a first neuron having a learning accumulator A11 and an inference accumulator A21, and a second neuron having a learning accumulator A12 and an inference accumulator A22. In the example of FIG. 2, there is a competitive process implemented in the learning process and the second neuron is such that it can be inhibited by the first neuron so that the second neuron is prevented from emitting a learning spike and triggering STDP learning. In the example of FIG. 3 there is no competitive process implemented in the inference process.

With reference to FIGS. 2 and 5, in response to the integrated inference spikes in the first accumulator A11 of the first neuron reaching the first threshold T1 (on the left on FIG. 2), the first neuron resets (at step S11) the integrated spikes in the first accumulator (on the right on FIG. 2 where the first accumulator A11 is emptied, i.e. it is reset), generates a learning spike and triggers (at step S13) synaptic conductance modification (as shown on the left on FIG. 2 by the arrow Tc directed to the synaptic inputs of the first neuron).

In addition, as here a competitive process is implemented in the learning process, in response to the integrated inference spikes in the first accumulator A11 of the first neuron reaching the first threshold T1, the method comprises said first neuron generating (at step S12) a learning inhibition signal IL and delivering the generated inhibition signal IL to neurons in the same hierarchical level (here the second neuron). In response to receiving the learning inhibition signal IL, the second neuron resets the integrated spike signals in its first accumulator A12 (as shown on the right on FIG. 3 where the accumulator A12 is reset) and is therefore prevented from generating a learning spike.

In an exemplary embodiment, the first neuron belongs to a neuronal map composed of a plurality of neurons and delivering by said first neuron the generated learning inhibition signal IL to neurons in the same hierarchical level comprises delivering the generated learning inhibition signal to the other neurons in the neuronal map. Intra-map learning inhibition is therefore implemented.

Figure 4:
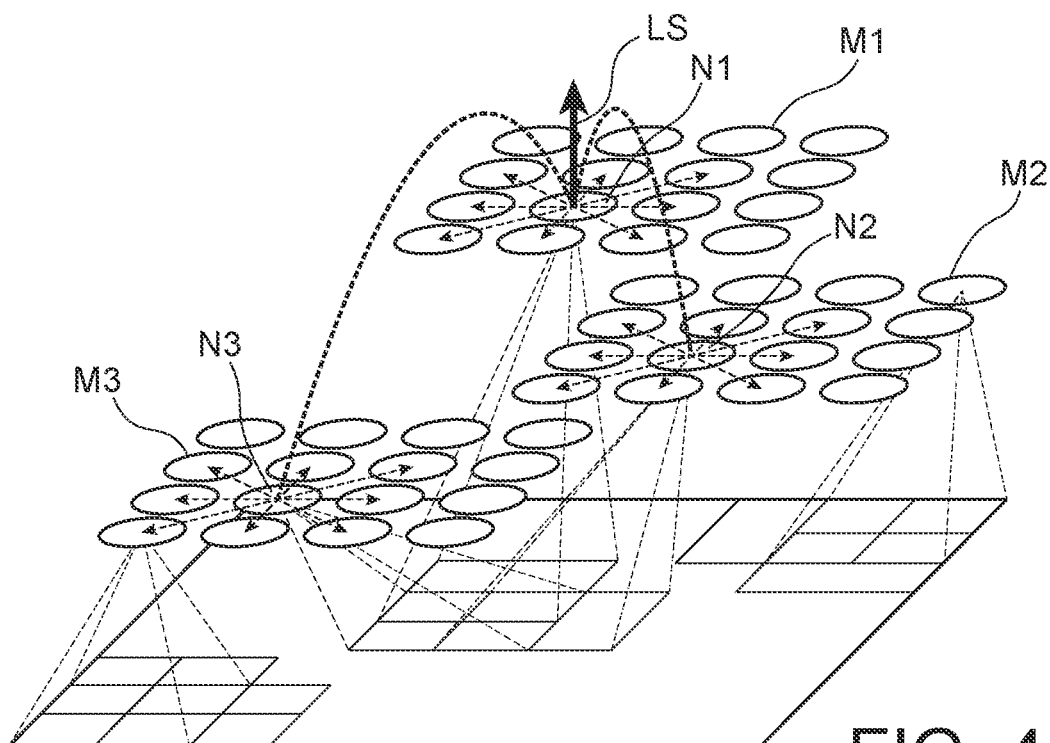
FIG. 4 shows the basis structure of a convolutional layer having several neuronal maps wherein inter-map learning inhibition is implemented.

Delivering the generated learning inhibition signal IL to neurons in the same hierarchical level may further comprise delivering the generated learning inhibition signal to neurons present in one or more other neuronal maps in a vicinity of a position corresponding to the location of said neuron in its neuronal map. Inter-map learning inhibition is therefore also implemented. In this respect, FIG. 4 shows neuron in a hierarchical level belonging to three different neuronal maps M1, M2, M3 (also called feature maps as each map is selective to a feature, for instance a visual feature). When dedicated to visual feature detection, these maps are arranged to detect features in an overlapping manner over the full image. Within a map, neurons are retinotopically arranged. If a neuron spikes in a map, such as neuron N1 in map M1 generating a learning spike LS, it inhibits those neurons in all neural maps around a small neighborhood of its position from triggering the learning process. Neurons N2 and N3 in maps M2 and M3 have the same position as neuron N1 in map M1. The small neighborhood of a neuron is here composed of neurons present at most at one hop from the neuron.

Turning now to the inference process, with reference to FIGS. 3 and 5, in response to the integrated inference spikes in the second accumulator A21 of the first neuron reaching the second threshold T2, the first neuron resets (at step S21) the integrated spikes in the second accumulator (on the right on FIG. 3 where the second accumulator A21 is emptied, i.e. it is reset), generates an inference spike IS (on the left on FIG. 3) and delivers (at step S22) the generated inference spike to the interconnected neurons of the upper hierarchical level. The second accumulator A22 of the second neuron is not affected, as no competitive mechanism is implemented in this example for the inference process.

But the invention also extends to the implementation of a competitive mechanism for the inference process. In such case the method further comprises, at said neuron, the steps of:
  in response to the integrated inference spikes in the second accumulator reaching the second threshold, generating an inference inhibition signal and delivering the generated inhibition signal to neurons in the same hierarchical level,
  in response to receiving an inference inhibition signal, resetting the second accumulator and inhibiting generation of an inference spike.

It may indeed be beneficial for learning in higher layers to enable a competitive process in the inference process. This mostly depends on the need to have several features contributing to the emitted spike code at a particular position or only the most salient feature. Such a competitive process therefore enables to smoothly switch between a one-hot feature representation, where only one feature can be active at a given position, and a more continuous representation, where multiple features can contribute partially. In this respect, the dual accumulator neuron is advantageous in that it allows to treat independently the competitive aspects of the learning and inference processes.

In the learning process, the spike-timing dependent plasticity rule may consist in increasing the conductance of a synapse that interconnects the winning (post-synaptic) neuron (first neuron in the example of FIG. 2 which learning accumulator reached the threshold T1 first) with an interconnected neuron of the lower hierarchical level (pre-synaptic neuron) if the interconnected neuron generated a learning spike since the last time the first accumulator of said winning neuron was reset (either because said neuron generated a learning spike or was inhibited to do so by another neuron in the same hierarchical level), and in decreasing said conductance otherwise. In other words, if $t_{post,last} < t_{pre} < t_{post}$ the conductance is increased, while it is decreased otherwise ($t_{post}$ being the time the winning post-synaptic neuron generates the learning spike, $t_{post,last}$ is the last time the first accumulator of said post-synaptic neuron was reset and $t_{pre}$ is the last time the interconnected pre-synaptic neuron generated an inference spike).

For instance, in such a spike-timing dependent plasticity rule, the conductance w of a synapse may be increased by a quantity $\alpha_+ \exp(-\beta_+ w)$ or decreased by a quantity $\alpha_- \exp(-\beta_- w)$, where $\alpha_+$ and $\alpha_-$ are learning rates such that $\alpha_+ > 0$ and $\alpha_- < 0$ and $\beta_+$ and $\beta_-$ are damping factors such that $\beta_+ \geq 0$ and $\beta_- \geq 0$. Typically, $\beta_-$ can be set to zero.

Interestingly, in the invention the learning process competitive mechanism only uses resets of the first (learning) accumulator to perform inhibition, and therefore takes away the need of defining an absolute inhibition time. Together with a learning rule that only depends on timing of spikes relative to this reset (all learning spike times are measured relative to the dynamics of postsynaptic spikes and resets of the first accumulator of postsynaptic neurons), learning can be performed in a fully event-based fashion on any input time-scale.

In a system which uses only one accumulator both for learning and spike propagation, such a reset-based inhibitory mechanism would destroy significant amounts of information for the propagation to the next layer. In particular it would prevent simultaneous emission of spikes from neurons in different maps connecting to the same input and of neurons in the same map connecting to different positions in the input.

After each convolutional layer, the network can perform a pooling operation over non-overlapping windows in each neuronal map to reduce the dimensionality of the input. In contrast to the architecture in Kheradpisheh et al. (2016), where a form of max-pooling is performed which only propagates the first spike in a pooling window, in an embodiment of the invention the pooling layer propagates all spikes which are emitted in the pooling window. This is necessary if the network should be defined independent of the input timescale, since else a point should be defined at which the pooling neuron is unlocked again (which is usually done when a new example is presented). Additionally, this allows to propagate a more flexible number of spikes to the following layers while reducing the size of the visual input. In one possible implementation, the pooling neurons are not actual neurons since they simple propagate all spikes from a certain input region, but in principle the pooling neurons could be replaced by more complex neuron model which has a more specific selectivity or a threshold value.

In a preferred implementation of the invention, the last layer in the network is a fully connected layer, which is trained with the same STDP mechanism as the convolutional layers. It merges the features from all positions and neuronal maps to learn a global, position independent representation of the classes present in the input data. This distinguishes the architecture of the invention from previous ones and enables to obtain spikes in the last layer which are direct indicators of the class the network detects.

The invention can be easily be integrated into most hardware implementations of spiking neurons (digital and analog) by simply adding a second integration accumulator which receives the same input as the ordinary accumulator.

The invention allows to train multiple layers simultaneously and to perform approximate inference during the learning phase. This is in particular relevant for online-learning applications, where a network has to learn continuously while being already partially functional for an inference application. This could be for example the case of a low power event-based vision system or intelligent portable systems which have to perform complex learning and inference on a tight power budget.

The below table compares the state of the art network with the one according to the invention and summarizes the benefits of the invention.

| State-of-the-art | The invention | Benefits |
| --- | --- | --- |
| One accumulator whose integration is subject to the competitive mechanism and who propagates spikes. Competitive mechanism also inhibits spike propagation | Two accumulators, one integrates the input for the competitive learning mechanism, the other one integrates the same input and propagates inference spikes | Competitive mechanism used for learning does not infer with information propagation to higher layers. Both processes are independent. |
| Competitive learning mechanism is enabled in every layer during learning and disabled for inference. | Competitive learning mechanism and inference are always enabled in all layers. | All layers can learn simultaneously on all training examples. Learning dynamics of all layers can influence each other, in particular lower layers can use feedback from higher layers. |
| Learning and spike propagation are subject to same neuron parameters (such as threshold) and same competitive mechanism | Learning and spike propagation can use different neural parameters and different competitive mechanisms. | Learning dynamics and propagation dynamics can be tuned independently |
| A competitive mechanism | Propagation of spikes is not | Ability to easily use a |

| State-of-the-art | The invention | Benefits |
| --- | --- | --- |
| which resets the integration of neurons can prevent propagation of spikes | inhibited by neuron resets due to competitive mechanism. Integrated information is not destroyed due to the competitive reset. | competitive mechanism which does not use inhibition times but integration resets. This takes away the need to define an absolute timescale for the inhibition. Also spike times can be defined relative to such a reset. This makes the network timescale invariant. All integrated information can be processed and propagated to the higher layers. |

The invention is not limited to the unsupervised learning method, but also extends to a multilevel hierarchical network of artificial neurons wherein each neuron is interconnected by means of artificial synapses to neurons of a lower hierarchical level and to neurons of an upper hierarchical level, said network being configured to perform said unsupervised learning method. In this network, neurons of the convolutional layers are dual-accumulators neurons that are configured to perform the steps of said method when an accumulator reaches its threshold value or when it receives an inhibition signal. Although in the network presented here the fully connected top layer does not use dual accumulator neurons, the invention also extends to the use of such neurons in (multi-layer) networks of fully connected layers. In that case, all neurons in the fully connected layer are subject to the potential inhibitory signals (since they all connect to the same input).

The invention also extends to the use of such a network after it has performed or when it is performing said method. Hence the invention covers a method for extracting and classifying patterns from a data stream, comprising inputting an asynchronous spike train in the multilevel hierarchical network after it has performed or when it is performing the unsupervised learning method. The asynchronous spike train may be generated from the data stream using a temporal-encoding layer or may correspond to data from an event-based sensor.

The invention claimed is:

1. A method for unsupervised learning of a multilevel hierarchical network of artificial neurons, wherein each neuron is interconnected with a plurality of artificial synapses to neurons of a lower hierarchical level and to neurons of an upper hierarchical level, the method comprising, at a particular neuron:
    integrating inference spikes from the interconnected neurons of the lower hierarchical level both in a first accumulator and in a second accumulator;
    in response to the integrated inference spikes in the first accumulator reaching a first threshold, resetting the first accumulator; generating a learning spike, and triggering synaptic conductance modification of those synapses, of the plurality of synapses, that interconnect the particular neuron with the interconnected neurons of the lower hierarchical level, in accordance with a spike-timing dependent plasticity rile;
    in response to the integrated inference spikes in the second accumulator reaching a second threshold, resetting the second accumulator, generating an inference spike, and delivering the generated inference spike to the interconnected neurons of the upper hierarchical level.

2. The method of claim 1, further comprising, at the particular neuron:
    in response to the integrated inference spikes in the first accumulator reaching the first threshold, generating a learning inhibition signal and delivering the generated inhibition signal to neurons in a same hierarchical level as that of the particular neuron,
    in response to receiving the learning inhibition signal, resetting the first accumulator and inhibiting generation of the learning spike.

3. The method according to claim 2, wherein the particular neuron belongs to a particular neuronal map composed of a plurality of neurons, and
    wherein the step of delivering by the particular neuron the generated learning inhibition signal to the neurons in the same hierarchical level as that of the particular neuron comprises delivering the generated learning inhibition signal to other of the plurality of neurons in the particular neuronal map.

4. The method of claim 3, wherein the step of delivering the generated learning inhibition signal to the neurons in the same hierarchical level as that of the particular neuron further comprises delivering the generated learning inhibition signal to those neurons, present in another neuronal map, that are located in a vicinity of a position within the another neuronal map that corresponds to a location of the particular neuron within the particular neuronal map.

5. The method according to claim 1, further comprising, at the particular neuron:
    in response to the integrated inference spikes in the second accumulator reaching the second threshold, generating an inference inhibition signal and delivering the generated inhibition signal to the neurons in the same hierarchical level as that of the particular neuron,
    in response to receiving the inference inhibition signal, resetting the second accumulator and inhibiting generation of the inference spike.

6. The method according to claim 1, wherein the spike-timing dependent plasticity rule includes increasing a conductance w of a synapse that interconnects the particular neuron with an interconnected neuron of the lower hierarchical level, when the interconnected neuron generated the learning spike since a last time the first accumulator of the particular neuron was reset, and decreasing the conductance w of the synapse otherwise.

7. The method of claim 6, wherein, in accordance with the spike-timing dependent plasticity rule, the conductance w of the synapse is increased by a quantity $\alpha_1 \exp(-\beta_1 w)$ or decreased by a quantity $\alpha_2 \exp(-\beta_2 w)$, where $\alpha_1$ and $\alpha_1$ are learning rates such that $\alpha_{-1} > 0$, $\alpha_{2-} < 0$, and $\beta_1$ and $\beta_2$ are damping factors such that $\beta_{1-} \geq 0$, $\beta_{2-} \geq 0$.

8. The method according to claim 1, wherein the first threshold and the second threshold are different.

9. A multilevel hierarchical network of the artificial neurons, wherein each neuron is interconnected with the plurality of artificial synapses to the neurons of the lower hierarchical level and to the neurons of the upper hierarchical level, said network being configured to perform the unsupervised learning method of claim 1.

10. A method for extracting and classifying patterns from a data stream, comprising inputting an asynchronous spike train into the multilevel hierarchical network of claim 9, after the multilevel hierarchical network has performed or is performing the unsupervised learning method.

* * * * *